United States Patent [19]

Verville

[11] Patent Number: 5,186,781
[45] Date of Patent: Feb. 16, 1993

[54] APPLICATION OF ADHESIVE DURING OPTICAL FIBER CANISTER WINDING

[75] Inventor: Thomas J. Verville, Tucson, Ariz.

[73] Assignee: Hughes Aircraft Company, Los Angeles, Calif.

[21] Appl. No.: 645,154

[22] Filed: Jan. 24, 1991

Related U.S. Application Data

[63] Continuation of Ser. No. 370,527, Jun. 23, 1989, abandoned, Continuation-in-part of Ser. No. 275,291, Nov. 23, 1988, abandoned.

[51] Int. Cl.⁵ .............................................. B65H 55/04
[52] U.S. Cl. .................................... 156/169; 156/166; 242/173; 427/434.7
[58] Field of Search ............... 156/166, 169, 425, 172; 427/434.7; 242/173, 172, 177; 206/389

[56] References Cited

U.S. PATENT DOCUMENTS

| H502 | 8/1988 | Mabee, III, et al. | 242/176 X |
|---|---|---|---|
| 2,430,032 | 11/1947 | Scott | 524/588 |
| 2,639,097 | 5/1953 | Scott, Jr. | 242/173 |
| 2,695,421 | 11/1954 | Amundson et al. | 427/434.7 |
| 2,973,911 | 3/1961 | Rayburn | 206/389 X |
| 3,681,185 | 8/1972 | Gelb | 156/169 X |
| 4,746,080 | 5/1988 | Pinson | 242/177 |

FOREIGN PATENT DOCUMENTS

| 940342 | 10/1963 | United Kingdom | 242/173 |
|---|---|---|---|
| 2147561 | 10/1984 | United Kingdom . | |

*Primary Examiner*—Jeff H. Aftergut
*Attorney, Agent, or Firm*—C. D. Brown; R. M. Heald; W. K. Denson-Low

[57] ABSTRACT

An optical fiber (12) is removably held in place on a payout bobbin (14) using an adhesive. The adhesive is applied directly to the optical fiber (12) by passing the optical fiber (12) through a pressure-less die applicator (28) that applies a uniform thin layer of adhesive to the optical fiber (12), prior to winding onto the bobbin (14). Winding preferably proceeds continuously within layers, and from layer to layer.

2 Claims, 1 Drawing Sheet

APPLICATION OF ADHESIVE DURING OPTICAL FIBER CANISTER WINDING

This is a continuation of application Ser. No. 07/370,527 filed Jun. 23, 1989, now abandoned.

Application Ser. No. 07/370,527 is a continuation in part of application Ser. No. 07/275291, filed Nov. 23, 1988, now abandoned.

BACKGROUND OF THE INVENTION

This invention relates to the use of optical fibers, and, more particularly, to the procedure for winding optical fibers onto a support.

Optical fibers are strands of glass fiber processed so that light beams transmitted therethrough are subject to total internal reflection. A large fraction of the incident intensity of light directed into the fiber is received at the other end of the fiber, even though the fiber may be hundreds of meters long. Optical fibers have shown great promise in communications applications, because a high density of information may be carried along the fiber and because the quality of the signal is less subject to external interferences of various types than are electrical signals carried on metallic wires. Moreover, the glass fibers are light in weight and made from a highly plentiful substance, silicon dioxide.

Glass fibers are typically fabricated by preparing a preform of glasses of two different optical indices of refraction, one inside the other, and processing the preform to a fiber by drawing, extruding, or other process. The optical fiber is coated with a polymer layer termed a buffer to protect the glass from scratching or other damage. As an example of the dimensions, in a typical configuration the diameter of the glass optical fiber is about 125 micrometers, and the diameter of the fiber plus the polymer buffer is about 250 micrometers (approximately 0.010 inches).

For such very fine fibers, the handling of the optical fiber to avoid damage that might reduce its light transmission properties becomes an important consideration. The fibers are typically wound onto a cylindrical or tapered cylindrical bobbin with many turns adjacent to each other in a side by side fashion. After one layer is complete, another layer of fiber is laid on top of the first layer, and so on. The final assembly of the bobbin and the wound layers of fiber is termed a canister, and the mass of wound fiber is termed the fiber pack. When the optical fiber is later to be used, the fiber is paid out from the canister in an unwinding operation.

It has been found by experience that, where the fiber is to be paid out from the canister in a rapid fashion, the turns of optical fiber must be held in place on the canister with an adhesive. The adhesive holds each turn of fiber in place as adjacent turns and layers are initially wound onto the canister, and also as adjacent turns and layers are paid out. Without the use of an adhesive, payout of the fibers may not be uniform and regular, leading to snarls or snags of the fibers that damage them or cause them to break as they are paid out.

The currently used optical fiber adhesive is a neoprene adhesive that is applied to the turns of optical fiber in a discontinuous fashion. That is, after a layer is wound onto the canister, the winding operation is stopped, and the adhesive is sprayed onto the layer. After a brief pause to permit the adhesive to dry, the next layer is wound overlying the layer to which the adhesive was applied. The discontinuous winding operation slows the production of wound fiber optical canisters.

There is a need for an improved winding approach for use in optical fiber winding and payout operations. Desirably, the winding would proceed regularly and rapidly, yet permit a suitable adhesive layer to be applied. The present invention fulfills this need, and further provides related advantages.

SUMMARY OF THE INVENTION

The present invention provides a process for winding an optical fiber onto a support, such that a uniform, controllable layer of adhesive is applied to the fiber to hold it in place. Fiber winding proceeds smoothly and rapidly, reducing the winding time required and improving the uniformity of the resulting canister. A key advantage of the present invention is achieving uniformity of the adhesive and the resulting fiber pack on the bobbin. With prior spray approaches, there may be variations due to uneven application of the adhesive. The variations can lead to uneven tensions during unwinding, or in the extreme case to snarling of the optical fiber if multiple turns are dispensed at one time. In particular, human spray operator variation can result in significant differences between fiber canisters that are wound at different times. The present approach eliminates such sources of variation.

In accordance with the invention, a process for fabricating an optical fiber canister comprises the steps of providing a support upon which an optical fiber is to be wound; passing the optical fiber continuously through an applicator containing a fluid adhesive, to coat the optical fiber with adhesive; and winding the optical fiber onto the support after it has passed through the applicator. The adhesive is applied over the optical fiber prior to winding of the fiber onto the support, preferably by pressure-less die application of the adhesive in a liquid carrier, concurrently with the winding operation.

An adhesive applicator used to apply a fluid adhesive to an optical fiber comprises a container of the adhesive, the adhesive being maintained at ambient pressure; and a die tip having a tip aperture therein at a point below the surface level of the adhesive, through which the optical fiber leaves the container, the size of the tip aperture being sufficiently greater than the size of the optical fiber that a layer of the adhesive remains adherent to the surface of the optical fiber after the fiber leaves the container, but not so great that adhesive may leak from the container. Preferably, the adhesive applicator also includes a septum having a septum aperture therein at a point below the surface level of the adhesive, through which the optical fiber enters the container, the size of the septum aperture being such that a seal is formed with the optical fiber so that adhesive may not leak from the container.

The present invention provides an advance in the art of the practical utilization of fiber optical systems. In many uses, the optical fiber is wound onto a support, and the present approach provides an improved method for winding the fiber onto the support while applying a uniform, controllable layer of adhesive to the fiber. The fiber is wound rapidly and continuously, achieving at least a 60–70 percent time savings in the winding operation, and operator variability is eliminated. Other features and advantages of the invention will be apparent from the following more detailed description of the preferred embodiment, taken in conjunction with the

DETAILED DESCRIPTION OF THE PREFERRED EMBODIMENT

In accordance with a preferred embodiment of the invention, a process for fabricating an optical fiber canister comprises the steps of providing a tapered cylindrical support upon which an optical fiber is to be wound; passing the optical fiber continuously through a pressure-less die applicator containing a fluid adhesive, to coat the optical fiber with adhesive, the applicator including a container of the fluid adhesive, the fluid adhesive being maintained at ambient pressure, a septum having a septum aperture therein at a point below the surface level of the adhesive, through which the optical fiber enters the container, the size of the septum aperture being such that a seal is formed with the optical fiber so that adhesive may not leak from the container, and a die tip having a tip aperture therein at a point below the surface level of the adhesive, through which the optical fiber leaves the container, the size of the tip aperture being sufficiently greater than the size of the optical fiber that a layer of fluid adhesive remains adherent to the surface of the optical fiber after the fiber leaves the container, but not so great that adhesive may leak from the container; and winding the optical fiber onto the support after it has passed through the die applicator.

A system for winding an optical fiber onto a bobbin to form a canister comprises a winding lathe that supports and turns the bobbin; means for guiding the optical fiber onto the bobbin; and an adhesive applicator that applies an adhesive to the optical fiber at a location prior to the optical fiber being wound onto the bobbin.

Figure 1:
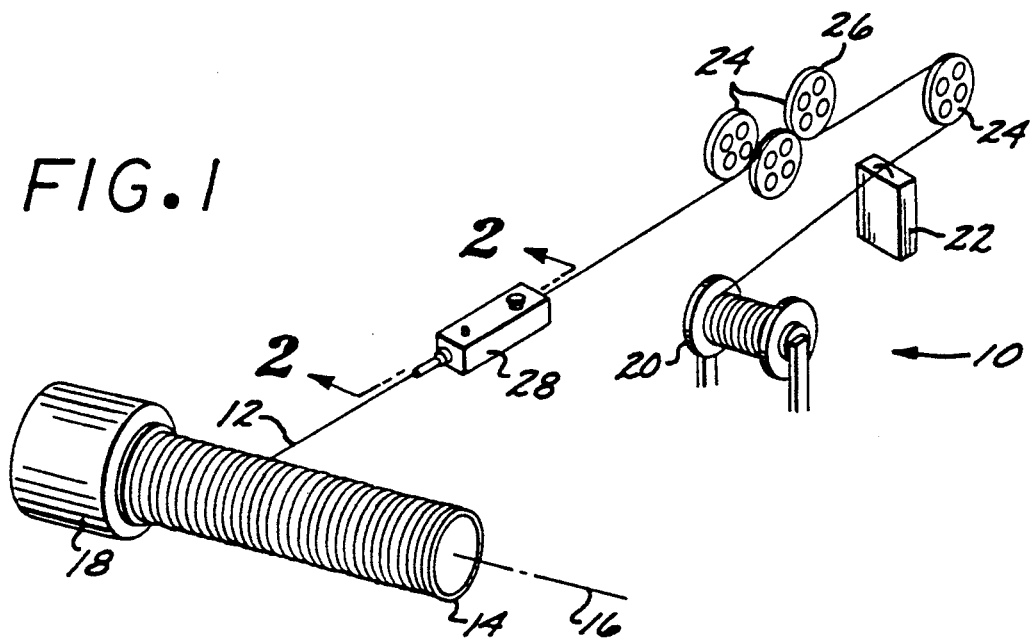
FIG. 1 is a schematic perspective view of an apparatus for winding an optical fiber onto a bobbin to form a canister, using the approach of the invention.

A preferred winding apparatus 10 for winding an optical fiber 12 onto a bobbin 14 is illustrated in FIG. 1. The bobbin 14 may be cylindrical, or, preferably, is a tapered cylinder that is tapered slightly from one end to the other, as by about 2 degrees of taper. In either case, the bobbin 14 has a cylindrical axis 16. The bobbin 14 is typically made of aluminum, with a winding of steel wire laid down overlying the aluminum to act as a guide for the laying down of the optical fiber 12. The bobbin 14 is mounted on a winding lathe 18 that rotates the bobbin 14 about the axis 16 in a controllable manner. Additionally, the winding lathe translates the bobbin 14 in the direction parallel to the axis 16, so that the optical fiber 12 may move along a constant line of travel as it is wound onto the bobbin 14. The lathe is geared so that the advance in each direction matches the turning rate, to permit the fiber to deposit uniformly, first upon the steel wire and thereafter upon the preceding layers of glass fiber.

The optical fiber 12 is initially supplied from a storage spool 20. As the fiber 12 is unwound from the spool 20, it passes through a guide 22 and over a set of rollers 24. The rollers 24 align the fiber 12 so that it meets the bobbin 14 at the correct angle and location. At least one of the rollers is a tensioning roller 26, which is spring loaded. The tensioning roller 26 cooperates with the lathe 18 to apply a proper tension to the fiber 12 as it is wound onto the bobbin 14.

After it passes over the rollers 24 but before it reaches the bobbin 14, the glass fiber 12 passes through a pressure-less die applicator 28, wherein a layer of adhesive is applied evenly to the surface of the fiber 12. In the applicator 28, the fiber passes through a bath containing the fluid adhesive, whose composition is discussed subsequently, so that the adhesive layer of the liquid mixture is deposited upon the surface of the fiber 12.

Figure 2:
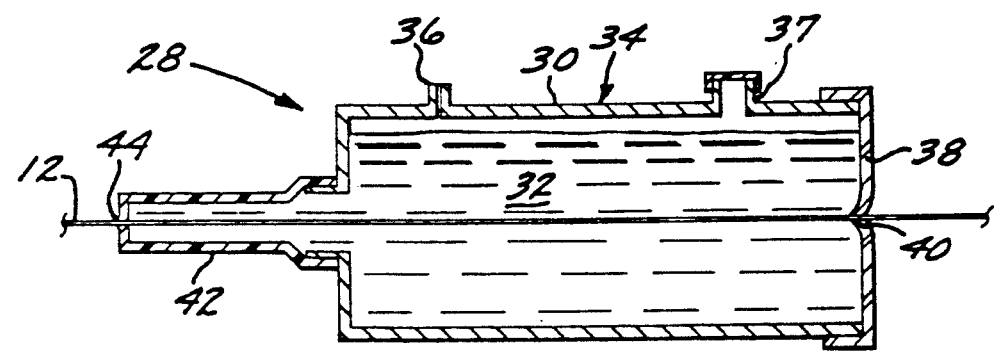
FIG. 2 is a side sectional view of a pressure-less die adhesive applicator.

The structure of the applicator 28 is shown in FIG. 2. In the illustrated preferred form, the applicator 28 is similar in appearance and size to a hypodermic syringe and needle. The applicator 28 includes a container 30 having a supply of fluid adhesive 32 therein. A top 34 of the container 30 has a vent opening 36 therethrough, so that the adhesive 32 is maintained at ambient (existing atmospheric) pressure. That is, in this preferred applicator no external pressure is applied to the adhesive, nor is the pressure of the adhesive permitted to fall below ambient pressure as adhesive is removed from the container 30. There is also an adhesive fill tube 37 in the top of the container 30, whereby additional fluid adhesive may be added to the container 30 while it continues to operate.

The container 30 includes a septum 38, which is preferably made of rubber, placed in one side wall of the container at a level below (and optionally above) the level of the adhesive 32. The septum 38 has a septum aperture 40 therethrough, extending from the interior of the container 30 to its exterior. The diameter of the septum aperture 40 is selected such that the optical fiber 28 may pass therethrough, but that adhesive cannot leak or flow out of the interior of the container during use. With the preferred rubber septum, the diameter of the aperture 40 is slightly smaller than the diameter of the optical fiber 12, so that the rubber of the septum 38 is in compression when the fiber 12 is present. The septum therefore acts as a seal against the surface of the fiber 12, permitting the fiber to pass into the container 30 but not permitting the adhesive to leak out of the container. It would be possible, of course, to have an open top container and to introduce the optical fiber into the container through the opening. The approach of using a septum below the adhesive level is preferred, however, because the fiber is not required to be bent within the container 30.

A die tip 42 is disposed in another wall of the container 30. The die tip 42 includes a die tip aperture 44 from the interior of the container 30 to its exterior. Preferably, the die tip aperture 44 is positioned oppositely the septum aperture 40, so that the fiber 12 is not required to bend while it is within the applicator 28.

The die tip aperture 44 may be made of any suitable material, preferably a metal such as chromium steel or aluminum, and is dimensioned such that a layer of the fluid adhesive 32 is applied to the surface of the fiber 12 as it passes through the aperture 44 out of the container 30. However, the diameter should not be so large that there is leakage through the aperture 44. For a cylindrical fiber 12 of a typical total diameter (glass plus buffer layer) of 250 micrometers, the diameter of the die tip aperture 44 is preferably about 50 micrometers greater than the diameter of the fiber 12, or 300 micrometers. The nominal thickness of the wet adhesive layer, before drying, on the fiber 12 is therefore uniform and about 25 micrometers. After drying, the thickness of the adhesive layer is typically about 3 to about 5 micrometers thick. The diameter of the die tip aperture 44, relative to the diameter of the optical fiber 12, is an important basis for controlling the nature of the adhesive deposited upon the fiber.

Figure 3:
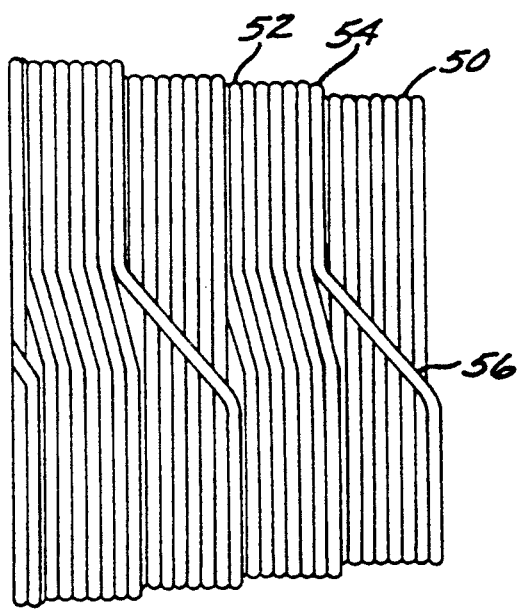
FIG. 3 is an elevational view of a detail of the canister of FIG. 1, illustrating a stable step-back between layers.

At the completion of winding each layer, the direction of movement of the bobbin 14 in the direction parallel to the cylindrical axis 16 is reversed, so that the next layer of fiber 12 can be deposited overlying the previously deposited layer. FIG. 3 illustrates the approach taken at the ends of layers. In the drawing, a first layer 50 is wound from left to right. At the completion of the first layer 50, the second layer 52 is wound from right to left overlying the first layer 50. The rightmost turn 34 of the second layer 52 does not commence exactly at the rightmost end of the first layer 50, but instead is set back by several turns. Such a set back approach in winding reduces the likelihood of snarls developing when the fiber 12 is later unwound from the bobbin 14. The optical fiber 12 therefore must execute a transition 56 from the rightmost end of the first layer 30 to the rightmost turn 54 of the second layer 52.

The ability to execute this transition is dependent upon the adhesive used on the fibers 12. If the adhesive is too weak, as, for example, by being too thin or of the wrong composition, the transition portion 56 may become loosened, so that several turns pull loose or the transition "walks around" the diameter of the fiber pack to cause successive turns of fiber 12 to unravel on the bobbin 14. The optical fiber 12 can consequently become snarled during payout.

The preferred adhesive of the invention is formed by mixing together about 25 percent by weight of 3,3,3-trifluoropropylmethylsiloxane (a fluorosilicone), and about 75 percent by weight of a polydimethylsiloxane of the general form

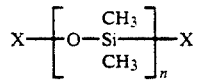

having end groups X of any operable type, such as, for example, Si(CH$_3$)$_3$ or Si(OH)$_3$. The value of n may vary, but is normally greater than 10.

The fluorosilicone is available commercially from Dow Corning as Type 94-003, which has about 55 percent by weight solids. The polydimethylsiloxane is available commercially from General Electric as Type GE6573PSA, which also has about 55 percent by weight solids.

It is expected that the present approach is operable with other types of adhesives, such as UV curable adhesives.

The fluorosilicone and the polydimethylsiloxane are mixed together, and then dissolved in an appropriate carrier medium. The medium may act in part as a solvent or as a means for moving a dispersion, but in either case serves to put the adhesive in a diluted form that can be readily delivered to the fibers. The preferred carriers are 1,1,2-trichloro-1,2,2-trifluoroethane, available commercially as Freon TF, 1,1,1-trichloroethane, known in the industry as TCA, or a mixture of the two. Freon TF has a lower affinity for water than does TCA, and therefore Freon TF or a mixture of Freon TF and TCA is the most preferred adhesive for use in wet or humid environments. Mixtures of Freon TF and TCA ranging from all Freon TF to all TCA have been tested and found operable in practicing the invention.

As the optical fiber moves from the applicator 28 to the point at which it is wound onto the bobbin 14, the solvent evaporates. The solvent evaporates so rapidly that the process might properly be considered a flashing of the solvent. Freon TF is a more volatile solvent than is TCA, and therefore the distance from the applicator 28 to the bobbin 14 can be made smaller for the Freon TF solvent, to achieve a comparable level of solvent evaporation. In practice, at a linear rate of movement of the optical fiber of about 3,280 inches per minute, the tip of the applicator 28 is placed at about 2-25 centimeters from the bobbin 14.

The ratio of the adhesive to the carrier is adjusted to allow delivery of an operable amount of the adhesive by the pressure-less die technique described earlier, and a 5 percent by weight/volume (diluted as necessary) concentration of the adhesive in the carrier has been found effective for this purpose.

The following examples should be taken as illustrative of the principles of the invention, and should not be taken as limiting of the invention in any respect.

EXAMPLE 1

A total of 70 canisters were wound using the approach of the invention, some with about 2.5 kilometers and some with about 20 kilometers of 250 micrometer diameter optical fiber. The time required to wind each of the 20 kilometer canisters was about 300 minutes, which is about ¼ of the time required to wind the canister using the prior approach of winding a layer, spraying the adhesive, and winding the next layer.

EXAMPLE 2

Fibers peeled statically from canisters wound as described in Example 1 were found to have about 3+/−2 milligrams of adhesive per 10 foot length. The operable range for the fiber coating is believed to be 1-7 milligrams per 10 foot length. The amount of adhesive is therefore readily controlled within the range using the present technique, and exhibits a very small range of variation.

The approach of the present invention thus provides a significant advance in the practical utilization of optical fibers that are supported as canisters on bobbins, and paid out before or during use. Although a particular embodiment of the invention has been described in detail for purposes of illustration, various modifications may be made without departing from the spirit and scope of the invention. Accordingly, the invention is not to be limited except as by the appended claims.

What is claimed is:

1. A continuous process for fabricating an optical fiber canister, comprising the steps of:
   providing an optical fiber;
   providing a support upon which the optical fiber is to be wound;
   passing the optical fiber continuously through applicator means for coating the optical fiber with a uniform layer of adhesive consisting of a mixture of polydimethylsiloxane and 3,3,3-trifluoropropylmethylsiloxane; and
   winding the optical fiber continuously onto the support after it has passed through the applicator means.

2. A process for continuously fabricating an optical fiber canister, comprising the steps of:

providing an optical fiber;

providing a support upon which the optical fiber is to be wound, the support having an axis of rotation;

rotating the support about its axis of rotation while simultaneously moving the support parallel to its axis of rotation;

passing the optical fiber continuously through a pressure-less die applicator containing a fluid adhesive consisting of a mixture of polydimethylsiloxane and 3,3,3-triflouropropylmethylsiloxane prior to the optical fiber contacting the support, to coat the optical fiber with adhesive, the applicator including a container of the fluid adhesive, the fluid adhesive being maintained at ambient pressure, a septum having a septum aperture therein at a point below the surface level of the adhesive, through which the optical fiber enters the container, the size of the septum aperture being such that a seal is formed with the optical fiber so that adhesive may not leak from the container, and a die tip having a tip aperture therein at a point below the surface level of the adhesive, through which the optical fiber leaves the container, the size of the tip aperture being sufficiently greater than the size of the optical fiber that a layer of fluid adhesive remains adherent to the surface of the optical fiber after the fiber leaves the container, but not so great that adhesive may leak from the container; and winding the optical fiber continuously onto the support under a constant tension after it has passed through the die applicator.

* * * * *